No. 867,482. PATENTED OCT. 1, 1907.
A. S. CUBITT.
LOCKING MECHANISM FOR CONTROLLER HANDLES.
APPLICATION FILED JAN. 2, 1906.
2 SHEETS—SHEET 1.
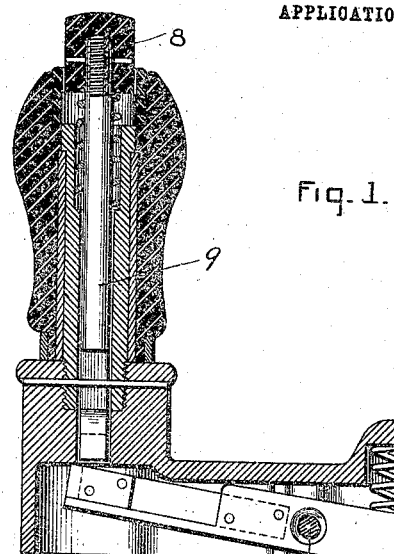
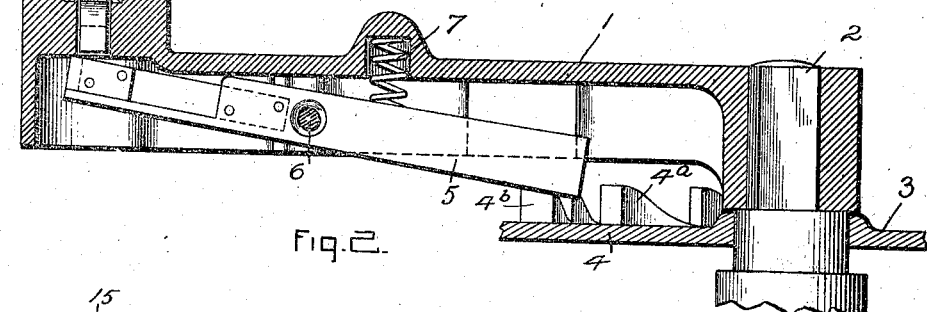
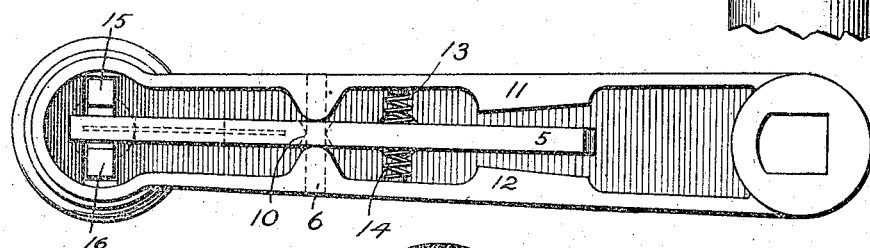
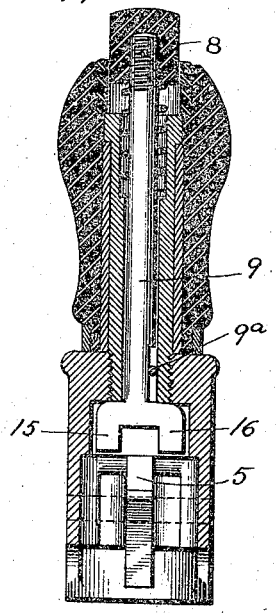
WITNESSES.
W. Ray Taylor.
Helen Oxford
INVENTOR.
A. S. Cubitt.
by Albert H. Davis
Atty.

No. 867,482. PATENTED OCT. 1, 1907.
A. S. CUBITT.
LOCKING MECHANISM FOR CONTROLLER HANDLES.
APPLICATION FILED JAN. 2, 1906.

2 SHEETS—SHEET 2.

WITNESSES
W. Ray Taylor
Helen Oxford

INVENTOR
A. S. Cubitt.
by Albert G. Davis
Atty.

UNITED STATES PATENT OFFICE.

ARCHIBALD S. CUBITT, OF SCHENECTADY, NEW YORK, ASSIGNOR TO GENERAL ELECTRIC COMPANY, A CORPORATION OF NEW YORK.

LOCKING MECHANISM FOR CONTROLLER-HANDLES.

No. 867,482.  Specification of Letters Patent.  Patented Oct. 1, 1907.

Application filed January 2, 1906. Serial No. 294,091.

*To all whom it may concern:*

Be it known that I, ARCHIBALD S. CUBITT, a subject of the King of Great Britain, residing at Schenectady, county of Schenectady, State of New York, have invented certain new and useful Improvements in Locking Mechanism for Controller-Handles, of which the following is a specification.

It is sometimes desirable in the case of controllers, such as the ordinary electric street-car controllers, or other movable devices, to provide means for automatically and positively stopping them at a predetermined point or points in their movement; and the present invention comprises a simple and novel construction and arrangement of parts, to be hereinafter described and particularly pointed out in the claims, for effecting this result.

Figure 4:
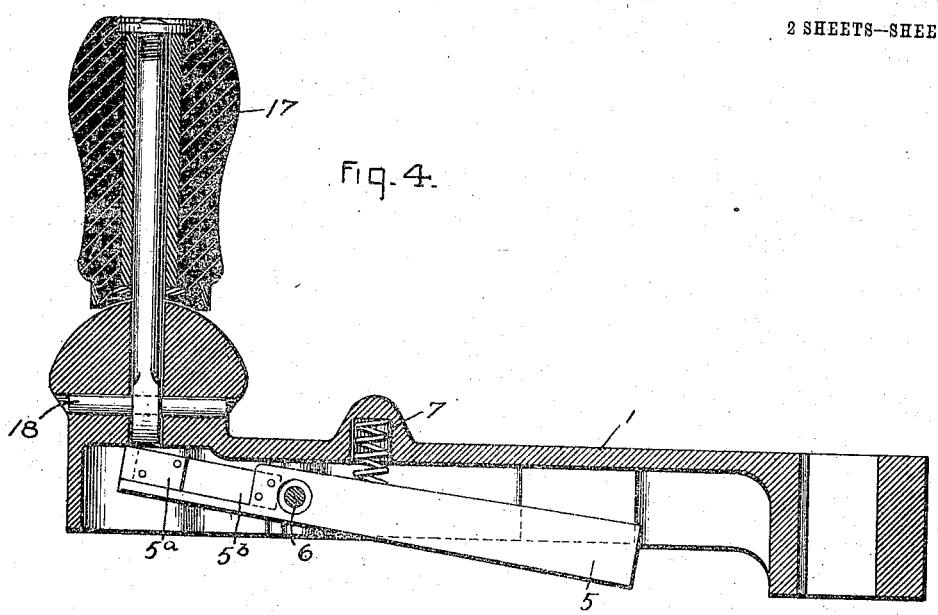
Figure 5:
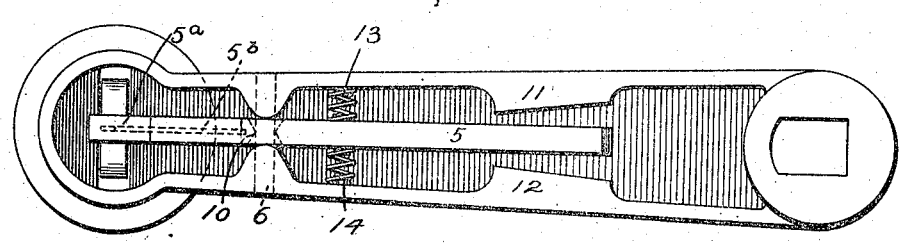
Figure 6:
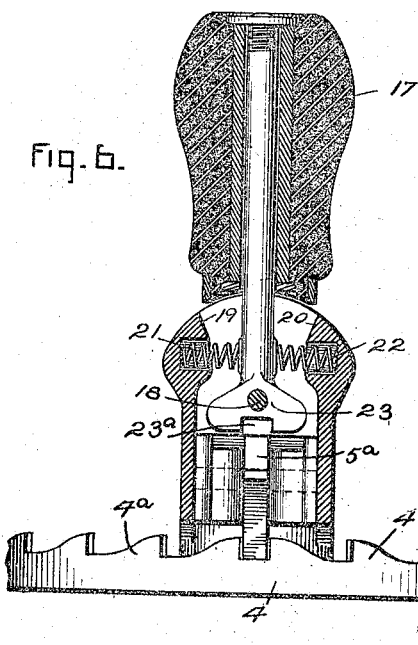

I have illustrated preferred embodiments of the present invention in the accompanying drawings, wherein:

Figure 1 is a cross-section through a controller handle and the top of a controller casing; Fig. 2 a bottom plan view of the handle; Fig. 3 a vertical cross-section through the grip of the controller handle; and Figs. 4, 5 and 6, are views corresponding to Figs. 1, 2 and 3, respectively, showing a further modification.

It is, of course, understood that although the present invention is illustrated and will be described in detail as applied to the handle of an electric motor controller, it may be employed in connection with handles other than controller handles and with movable devices other than handles of any kind.

Reference being had to the drawings, 1 indicates a handle mounted upon the upper end of a controller-cylinder-supporting shaft 2 for rotating the same; 3 is the top of the controller casing through which the shaft 2 projects. Upon the casing 3 is arranged a toothed segment 4 which coöperates with a dog 5 on the controller handle to positively arrest the controller in its several running positions. The dog 5 is pivotally supported on the pin 6 for movement in a vertical plane and is normally held in its locking position by spring 7. All these parts are substantially the same as corresponding parts in controllers having segments and dogs adapted to hold the controller in predetermined positions, except that the teeth on the segment are preferably ratchet teeth, as shown at 4$^a$ and 4$^b$, in order to permit the controller to be brought into the "off" position without interference; also the opening 10 in the dog, through which the supporting pin passes, is so formed that the dog may oscillate laterally between shoulders 11 and 12, being normally held in a central position by springs 13 and 14.

In the construction shown in Figs. 1-3 a push button 8, having a stem 9, is adapted to engage one end of the dog to move it out of the plane of the ratchet teeth against the tension of the spring when the push button is depressed. The movement of the stem 9 is limited by a pin 9$^a$ and the lower end of the stem is made U-shaped so that when the locking dog is in its normal position, as shown in Figs. 2 and 3, the push button may be depressed without affecting the dog, the arms 15 and 16 of the U-shaped portion simply passing by the rear end of the dog on opposite sides thereof. When, however, the handle is moved either to the right or to the left of its "off" position, the dog strikes against the vertical face of one of the teeth on the segment 4 and its movement is arrested. The controller handle is, however, free to continue its movement until the shoulder 11 or 12, as the case may be, abuts against the side of the locking dog, whereupon the handle itself is held against a continuation of its movement. This operation has brought the rear end of the dog directly below one of the arms 16 or 15, as the case may be, so that if the push button is now depressed, the locking dog is lifted out of engagement with the tooth on the segment, releasing the handle. The handle may now be turned freely until it reaches the next position, namely until it is arrested by the next succeeding tooth on the segment.

It will be noted that as soon as the push button has been operated to release the dog from a tooth or stop, the spring 13 or 14, which has previously been compressed, expands and returns the dog into its central position so that it is impossible for the operator to maintain the dog raised out of the plane of the teeth on the segment and therefore he cannot move the controller handle through successive steps without stopping.

In Figs. 4, 5 and 6, instead of employing a push button to operate the dog to release the controller handle, I make the entire grip of the controller handle movable, so that when the controller handle is being turned in a forward direction it is released in its various positions through a slight forward movement of the grip, while the release is effected during backward movements of the controller handle by a slight backward movement of the grip. For this purpose the grip 17 is pivoted on a horizontal pin 18, being free to oscillate between shoulders 19 and 20 on the handle and held in a central position by springs 21 and 22. At the lower end of the grip or the stem upon which the grip is mounted is arranged a U-shaped cam 23 so constructed that, when the locking dog is in its normal position, the grip may be oscillated in either direction without disturbing the dog; while, when the dog has been moved into either extreme position laterally of the controller handle, an oscillatory movement of the grip will cause the cam to depress the rear end of the dog in the same manner that this is done by the arms 15 and 16 in the push-button construction.

The rear end of the dog 5 is preferably provided with a loose piece 5" held in position by a spring 5ᵇ, as illustrated. This prevents binding of or injury to the parts in case the releasing member is held down by the operator when approaching a tooth in the segment. Also, in the case of the construction shown in Figs. 4-6, in which the grip is normally oscillated in the direction in which the handle is being moved, the member 5ᵃ is held in the central position by the notch 23ᵃ in the cam while the dog is moving laterally. Then, when the grip is released or brought to its normal position, the member 5ᵃ snaps into alinement with the main portion of the dog, which may then be released by again oscillating the grip in the direction in which the handle has been moving.

The arrangements illustrated are adapted for use with handles or devices arranged to move in either direction from an intermediate or "off" position; but if only one of these movements is required, then one of the sets of teeth, 4ᵃ and 4ᵇ, may be omitted, the locking dog need not be made to oscillate in both directions from its central position, and only one operating projection is required on the push button or on the pivoted grip.

What I claim as new and desire to secure by Letters Patent of the United States, is,—

1. In combination, a movable device, a dog carried by said device, an operating member for said dog, said dog being normally held out of operative relation to said operating member, and a stop located in the path of said dog when the device is moved, the arrangement being such that the stop engages said dog and moves it into operative relation with its said operating member and arrests the movement of said device.

2. In combination, a movable device, a stop, a dog carried by said device and lying normally in the plane of said stop, for engagement therewith to arrest the said device, a member adapted to move said dog out of the plane of said stop, and means controlled by said stop for moving said dog out of operative relation with said operating member.

3. In combination, a movable device, a lock for said device comprising a fixed stop and a dog carried by said device, a releasing member for said dog normally out of operative relation thereto, said dog being moved into operative relation to its releasing member by said stop.

4. In combination, a movable device, a dog carried by said device and having limited movement in planes at an angle to each other, a member adapted to operate said dog in one of said planes and normally out of operative relation to said dog, a stop mounted on a fixed member and adapted to be engaged by said dog and to move it in the other of said planes into operative relation to said operating member.

5. A controller handle provided with a dog having a limited movement in two planes at an angle to each other, a device adapted to operate said dog in one of said planes, and a spring for holding said dog out of operative relation to said device.

6. In combination, a stop, and a movable device coöperating with said stop and comprising a dog mounted on said device and movable between limits in the direction of movement of said device and having a further movement into and out of engagement with said stop, a releasing member coöperating with said dog only when the dog is at one of its limits of movement, and means for moving said dog to the other of said limits.

7. In combination, a movable device, a stop, a dog mounted on said device and adapted to engage said stop, an operating member for said dog, and means tending normally to move said dog in the plane of movement of said device and out of the path of movement of said operating member.

8. In combination, a movable device, a locking dog on said device, a member for operating said dog normally out of operative relation to said dog, and a stop mounted on a fixed support and adapted to engage said dog and move it into operative relation to said operating member.

9. In combination, a movable device, a stop, a dog on said device adapted to engage said stop, an operating member for releasing the dog from the stop, and a spring for disconnecting said dog from said operating member when the dog is released from the stop.

10. In combination, a movable device, a stop, a dog carried by said device, an operating member for said dog, means for holding said dog normally out of operative relation to said operating member, the arrangement being such that the dog is brought into operative relation with the operating member only when the dog is in engagement with the stop.

In witness whereof, I have hereunto set my hand this 30th day of December, 1905.

ARCHIE S. CUBITT.

Witnesses:
BENJAMIN B. HULL,
HELEN ORFORD.